United States Patent [19]
Convertini et al.

[11] Patent Number: 5,882,022
[45] Date of Patent: Mar. 16, 1999

[54] STROLLER STANDING PLATFORM

[76] Inventors: John A. Convertini; Rachel A. Convertini, both of 3763 Northwood Dr, Niagara Falls, Ontario, Canada, L2H 2Y5

[21] Appl. No.: 828,052

[22] Filed: Mar. 28, 1997

[51] Int. Cl.⁶ .................................................. B62B 7/00
[52] U.S. Cl. ........................................................ 280/47.38
[58] Field of Search ................ 280/33.992, 33.993, 280/47.18, 47.25, 47.35, 47.36, 47.38, 47.4, 87.04, 642, 643, 647, 648, 650, 658; 297/232, 243

[56] References Cited

U.S. PATENT DOCUMENTS 4,741,056  5/1988  Kassai ....................... 280/643
5,312,122  5/1994  Doty ........................ 280/33.992

Primary Examiner—Robert J. Oberleitner
Assistant Examiner—C. T. Bartz

[57] ABSTRACT

A new Stroller Standing Platform for transporting two children with a stroller wherein one child is in a standing position. The inventive device includes a platform member including a lip portion wherein the platform member is positionable over a cross member of the stroller such that the lip portion couples the platform member to the cross member. A pair of spaced support members are each joined at one end to the platform member and at another end to the handle assembly of the stroller. As such, a child may stand on the platform member and hold onto each of the support members.

12 Claims, 3 Drawing Sheets

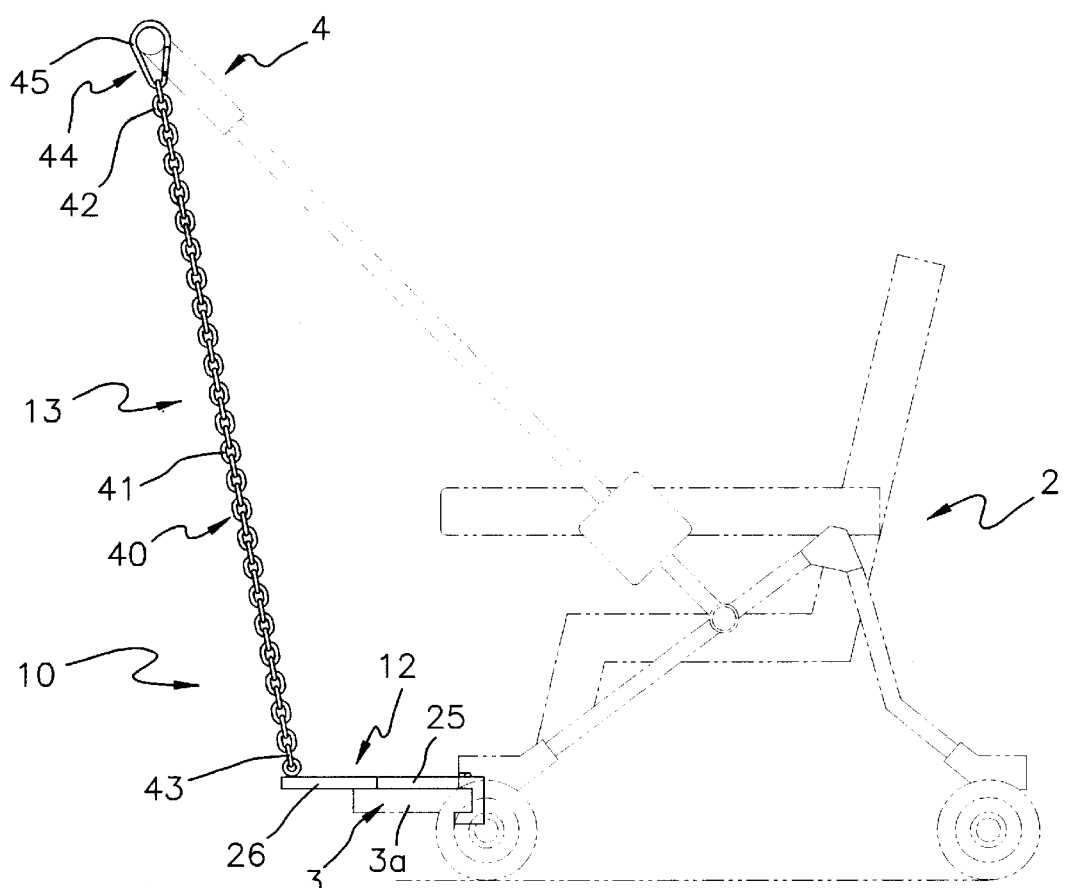
Fig.1
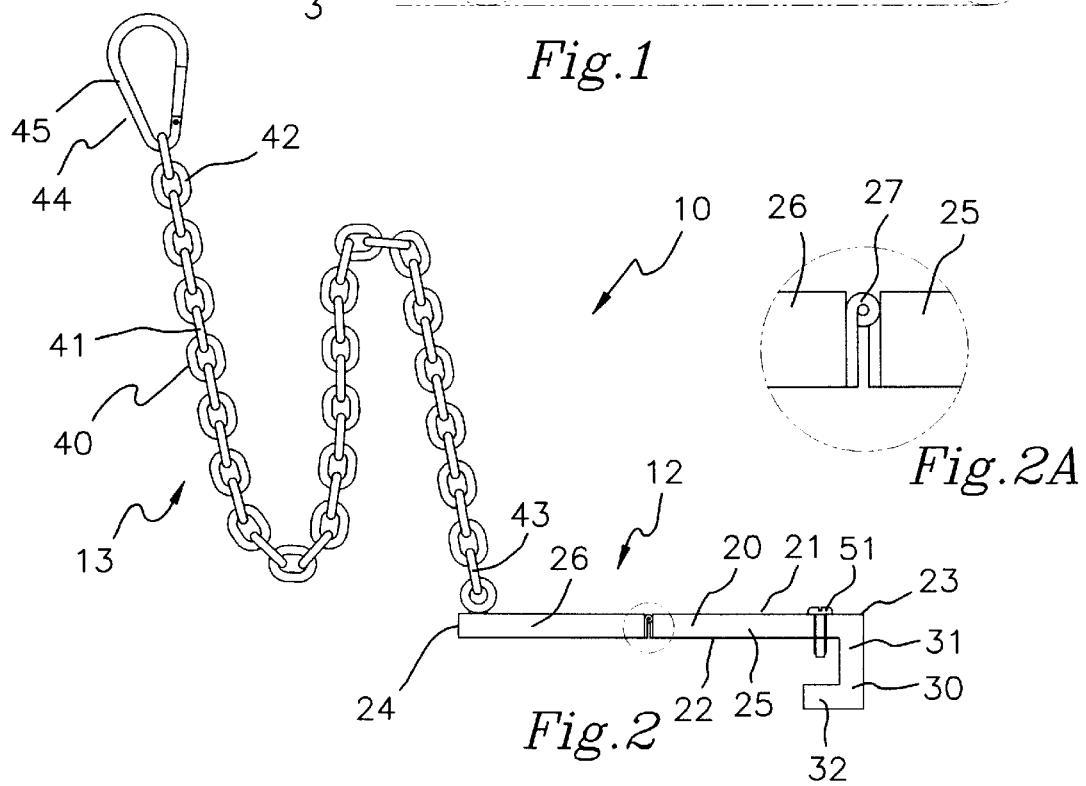
Fig.2
Fig.2A

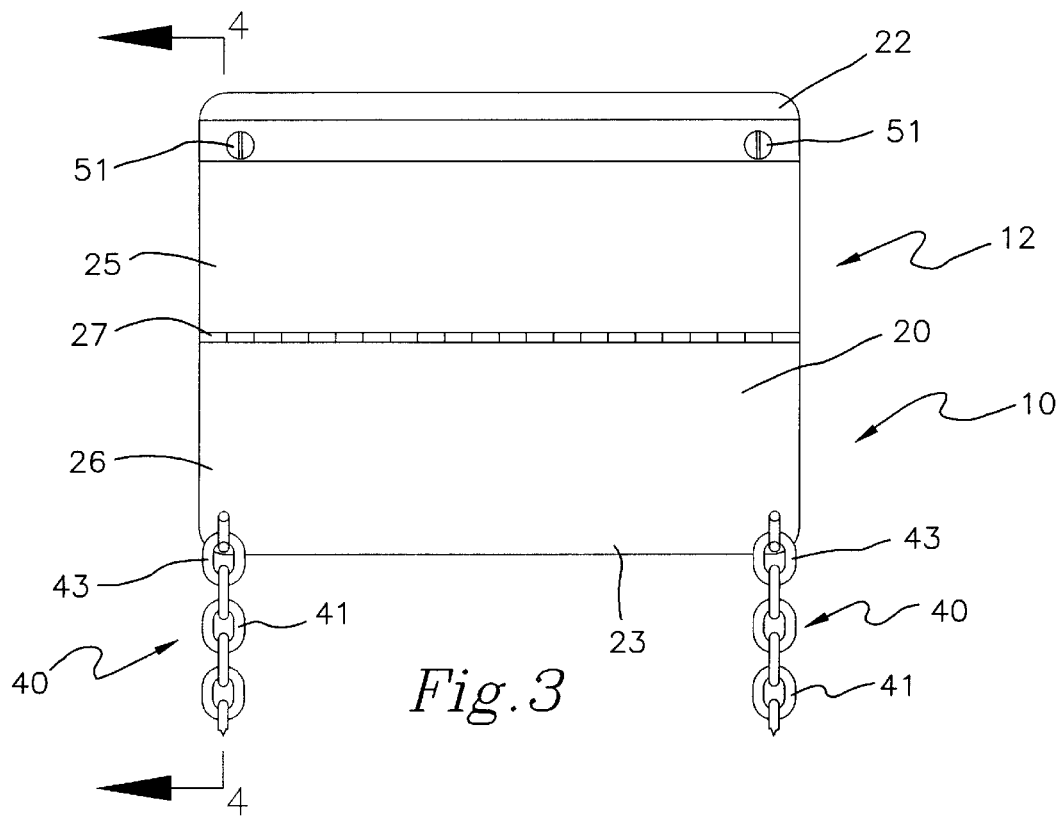
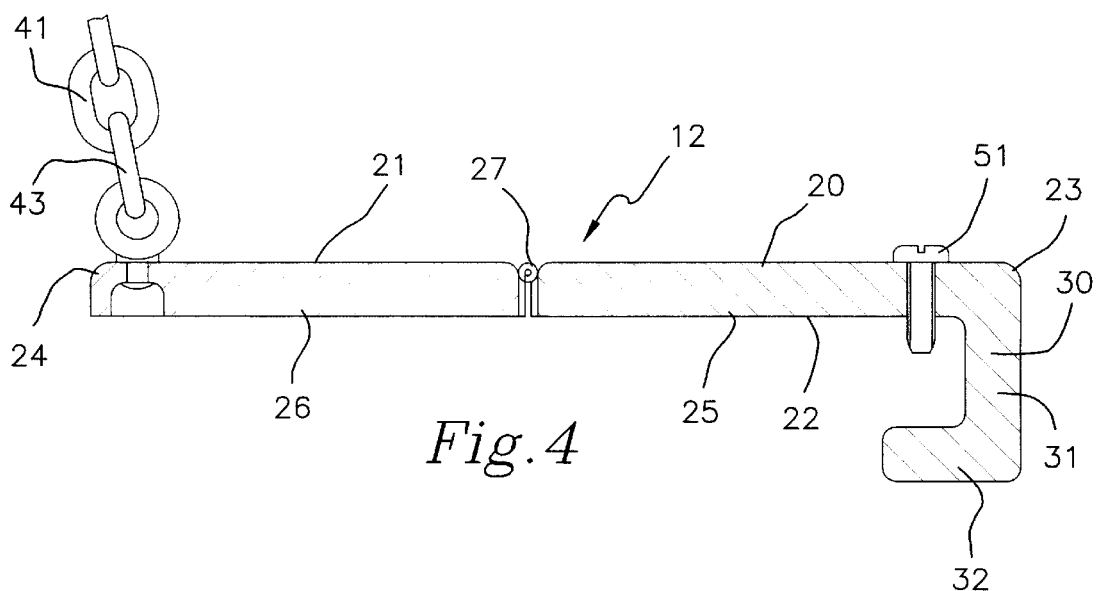

STROLLER STANDING PLATFORM

BACKGROUND OF THE INVENTION

1. Field of the Invention

The present invention relates to stroller accessories and more particularly pertains to a new Stroller Standing Platform for transporting two children with a stroller wherein one child is in a standing position.

2. Description of the Prior Art

The use of stroller accessories is known in the prior art. More specifically, stroller accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art stroller accessories include U.S. Pat. No. 4,657,269; U.S. Pat. No. 4,725,071; U.S. Pat. No. D270,951; U.S. Pat. No. 4,741,056; U.S. Pat. No. 5,234,077; and U.S. Pat. No. 5,090,724.

While these devices fulfill their respective, particular objectives and requirements, the aforementioned patents do not disclose a new Stroller Standing Platform. The inventive device includes a platform member including a lip portion wherein the platform member is positionable over a cross member of the stroller such that the lip portion couples the platform member to the cross member. A pair of spaced support members are each joined at one end to the platform member and at another end to the handle assembly of the stroller. As such, a child may stand on the platform member and hold onto each of the support members.

In these respects, the Stroller Standing Platform according to the present invention substantially departs from the conventional concepts and designs of the prior art, and in so doing provides an apparatus primarily developed for the purpose of transporting two children with a stroller wherein one child is in a standing position.

SUMMARY OF THE INVENTION

In view of the foregoing disadvantages inherent in the known types of stroller accessories now present in the prior art, the present invention provides a new Stroller Standing Platform construction wherein the same can be utilized for transporting two children with a stroller wherein one child is in a standing position.

The general purpose of the present invention, which will be described subsequently in greater detail, is to provide a new Stroller Standing Platform apparatus and method which has many of the advantages of the stroller accessories mentioned heretofore and many novel features that result in a new Stroller Standing Platform which is not anticipated, rendered obvious, suggested, or even implied by any of the prior art stroller accessories, either alone or in any combination thereof.

To attain this, the present invention generally comprises a platform member including a lip portion wherein the platform member is positionable over a cross member of the stroller such that the lip portion couples the platform member to the cross member. A pair of spaced support members are each joined at one end to the platform member and at another end to the handle assembly of the stroller. As such, a child may stand on the platform member and hold onto each of the support members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Stroller Standing Platform apparatus and method which has many of the advantages of the stroller accessories mentioned heretofore and many novel features that result in a new Stroller Standing Platform which is not anticipated, rendered obvious, suggested, or even implied by any of the prior art stroller accessories, either alone or in any combination thereof.

It is another object of the present invention to provide a new Stroller Standing Platform which may be easily and efficiently manufactured and marketed.

It is a further object of the present invention to provide a new Stroller Standing Platform which is of a durable and reliable construction.

An even further object of the present invention is to provide a new Stroller Standing Platform which is susceptible of a low cost of manufacture with regard to both materials and labor, and which accordingly is then susceptible of low prices of sale to the consuming public, thereby making such Stroller Standing Platform economically available to the buying public.

Still yet another object of the present invention is to provide a new Stroller Standing Platform which provides in the apparatuses and methods of the prior art some of the advantages thereof, while simultaneously overcoming some of the disadvantages normally associated therewith.

Still another object of the present invention is to provide a new Stroller Standing Platform for transporting two children with a stroller wherein one child is in a standing position.

Yet another object of the present invention is to provide a new Stroller Standing Platform which includes a platform member including a lip portion wherein the platform member is positionable over a cross member of the stroller such that the lip portion couples the platform member to the cross member. A pair of spaced support members are each joined at one end to the platform member and at another end to the handle assembly of the stroller. As such, a child may stand on the platform member and hold onto each of the support members.

Still yet another object of the present invention is to provide a new Stroller Standing Platform that would adapt a stroller for use in transporting two children, wherein one of the children is able to walk yet, does not have the endurance for a long walk. Accordingly, the present invention allows a child to rest by standing and riding on the stroller, thereby saving a parent the hassle and fatigue of carrying the child. Thus, the present invention enables a family with two young children to take walks together as a family.

Even still another object of the present invention is to provide a new Stroller Standing Platform that can be easily installed on and removed from a stroller.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an illustration of a new Stroller Standing Platform installed on a stroller according to the present invention.

FIG. 2 is an side view of the present invention removed from the stroller.

FIG. 3 is top view of the platform of the present invention.

FIG. 4 is a cross sectional view taken along line 4—4 of FIG. 3.

DESCRIPTION OF THE PREFERRED EMBODIMENT

Figure 5:
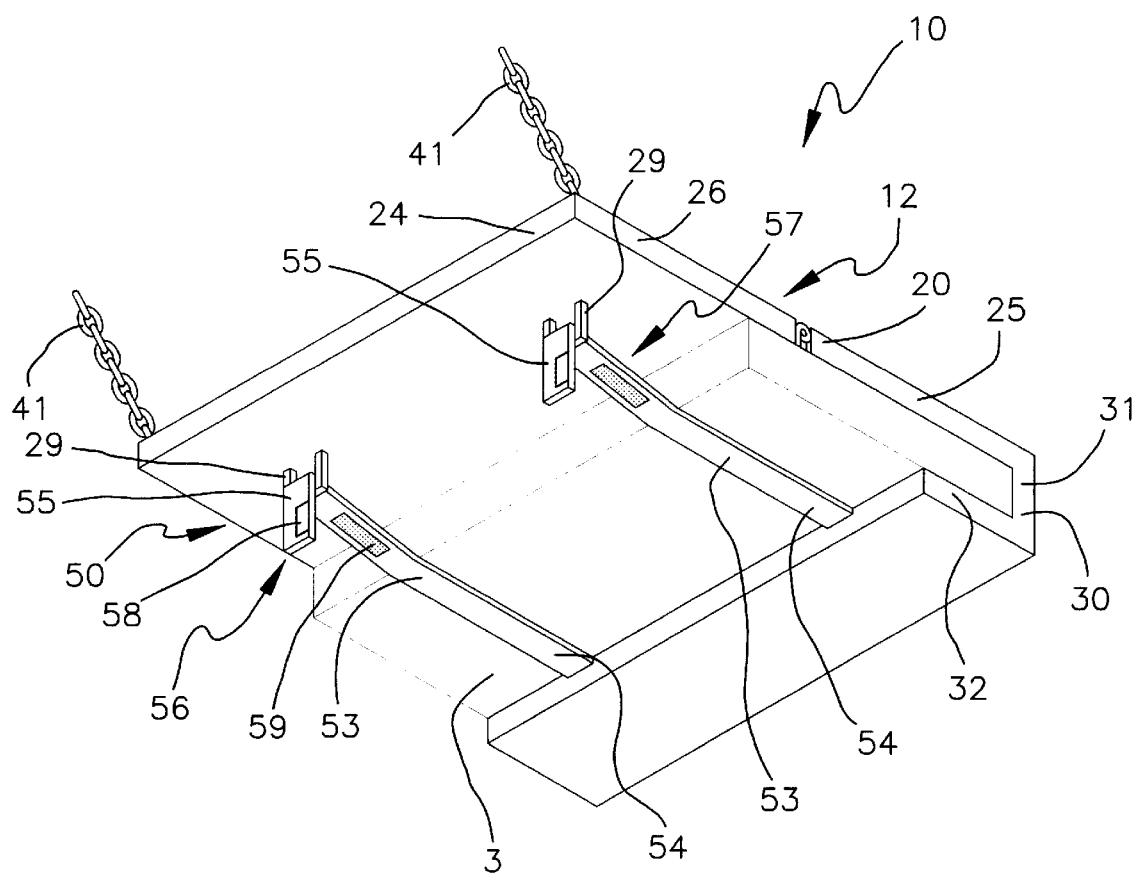
FIG. 5 is a bottom isometric view of the platform of the present invention.

With reference now to the drawings, and in particular to FIGS. 1 through 5 thereof, a new Stroller Standing Platform embodying the principles and concepts of the present invention and generally designated by the reference numeral 10 will be described.

More specifically, it will be noted that the Stroller Standing Platform 10 comprises a platform member 12 including a lip portion 30 wherein the platform member 12 is positionable over a cross member 3 of the stroller 2 such that the lip portion 30 couples the platform member 12 to the cross member 3. A pair of spaced support members 40 are each joined at one end to the platform member 12 and at another end to the handle assembly 4 of the stroller 2. As such, a child may stand on the platform member 12 and hold onto each of the support members 40.

As best illustrated in FIG. 1, it can be shown that the present invention is intended for use with a stroller 2 including a cross member 3, such as a step 3a, interconnecting opposite sides of the stroller 2. The stroller 2 also includes a handle assembly 4 positioned above the cross member 3.

As best illustrated in FIGS. 1 through 4, it can be shown that the platform member 12 includes a platform portion 20 and a lip portion 30. The platform portion 20 has an upper surface 21, a lower surface 22, a forward edge 23, and a rearward edge 24. The lip portion 30 is provided along the forward edge 23 of the platform portion 20 and comprises a first plate 31 perpendicularly extending from the lower surface 22 of the platform portion 20 and a second plate 32 perpendicularly extending from the first plate 31 toward the rearward edge 24 of the platform portion 20. As such, the second plate 32 of the lip portion 30 parallels the platform portion 20 in spaced relation.

The platform member 12 is positioned over the cross member 3 of the stroller 2 such that the lower surface 22 of the platform portion 20 rests on a top surface of the cross member 3 and such that the first plate 31 of the lip portion 30 abuts a front edge of the cross member 3. Ideally, the second plate 32 of the lip portion 30 abuts a bottom surface of the cross member 3. As such, the platform portion 20 of the platform member 12 extends significantly beyond the cross member 3. In an illustrative embodiment, the platform portion 20 is about 11 inches wide and 8 inches long.

The platform portion 20 comprises a first platform 25 and a second platform 26 hingedly coupled to the first platform 25 by a hinge 27. As such, the second platform 26 may be pivoted and positioned over the first platform 25 such that the platform member 12 will not interfere with the storage and portability of the stroller 2.

A support means 13 is provided for supporting the platform member 12 from the handle assembly 4 of the stroller 2. The support means 13 comprises a pair of spaced support members 40 each having an upper end 42 and a lower end 43. The lower end 43 of each support member 40 is attached to the platform member 12 adjacent the rearward edge 24 thereof. The upper end 42 of each support member 40 is detachably coupled to the handle assembly 4 by a detachable coupling means 44. The detachable coupling means 44 may comprise a hook 45 adapted for hooking onto the handle assembly 4, a strap (not shown) adapted for looping around the handle assembly 4, or a similar coupling device. Furthermore, each of the pair of spaced support members 40 may comprise a chain 41, a rope (not shown), a cable (not shown), or a similar connecting member.

A securing means 50 is provided for securing the platform member 12 to the cross member 3 of the stroller 2. In a first embodiment, the securing means 50 comprises a fastener 51 inserted through the platform member 12 and into the cross member 3. In a second embodiment, as shown in FIG. 5, the securing means 50 comprises a pair of securing straps 53 wherein each of the securing straps 53 has a first end 54 joined to the second plate 32 of the lip portion 30 of the platform member 12 and a second end 55 looped through a loop 29 extending from the lower surface 22 of the platform portion 20. The second end 55 of the securing strap 53 is fastened to the securing strap 53 itself by a releasable fastening means 56 such as a hook and loop fastener 57. The hook and loop fastener 57 includes a hook portion 58 provided at the second of the securing strap 53 and a loop portion 59 provided intermediate the first end 54 of the securing strap 53 and the second end 55.

In use, the platform member 12 is positioned over the cross member 3 of the stroller 2 such that the lip portion 30 is coupled around the cross member 3. Thereafter, the support members 40 are each joined to the handle assembly 4 of the stroller 2. The platform member 12 is secured to the cross member 3 of the stroller 2 by fasteners 51 or by the securing strap 53 wherein the securing strap 53 is looped through the loop 29 extending from the lower surface 22 of the platform portion 20. As such, a child may stand on the platform member 12 and hold onto each of the pair of spaced support members 40 as a parent or other person pushes the stroller 2.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A stroller accessory for use with a stroller including a cross member and a handle assembly positioned above said cross member, said stroller accessory comprising:

a platform member including a platform portion and a lip portion, said platform member positionable in use over said cross member of said stroller, said lip portion being adapted to couple said platform member to said cross member of said stroller such that said platform portion is extendable in a cantilever relationship beyond said cross member;

said platform portion having an upper surface, a lower surface, a forward edge, and a rearward edge;

wherein said lip portion is provided along said forward edge of said platform portion, said lip portion comprising a first plate perpendicularly extending from said lower surface of said platform portion, and a second plate perpendicularly extending from said first plate toward said rearward edge of said platform portion, said second plate of said lip portion paralleling said platform portion in spaced relation;

wherein said platform member is positionable over said cross member of said stroller such that said lower surface of said platform portion is restable on a top surface of said cross member and such that said first plate of said lip portion abuts a front edge of said cross member; and a support means for supporting said platform member from said handle assembly of said stroller.

2. A stroller accessory for use with a stroller including a cross member and a handle assembly positioned above said cross member, said stroller accessory comprising:

a platform member including a platform portion and a lip portion, said platform member positionable in use over said cross member of said stroller, said lip portion being adapted to couple said platform member to said cross member of said stroller such that said platform portion is extendable in a cantilever relationship beyond said cross member;

said platform portion having an upper surface, a lower surface, a forward edge, and a rearward edge, wherein said lip portion is provided along said forward edge of said platform portion, said lip portion comprising a first plate perpendicularly extending from said lower surface of said platform portion, and a second plate perpendicularly extending from said first plate toward said rearward edge of said platform portion, said second plate of said lip portion paralleling said platform portion in spaced relation, and wherein said platform member is positioned over said cross member of said stroller such that said lower surface of said platform portion rests on a top surface of said cross member and such that said first plate of said lip portion abuts a front edge of said cross member; and a support means for supporting said platform member from said handle assembly of said stroller.

3. The stroller accessory of claim 1, wherein said platform portion comprises:

a first platform, and a second platform hingedly coupled to said first platform, whereby said second platform is pivotable so as to overlay said first platform.

4. The stroller accessory of claim 1, wherein said support means comprises:

a pair of spaced support members each having an upper end and a lower end, said lower end attached to said platform member, said upper end being adapted to couple to said handle assembly of said stroller.

5. The stroller accessory of claim 4, wherein each of said pair of spaced support members comprises a chain.

6. The stroller accessory of claim 4, further comprising:

a detachable coupling means being adapted for detachably coupling each of said pair of spaced support members to said handle assembly.

7. The stroller accessory of claim 6, wherein said detachable coupling means comprises:

a hook joined to said upper end of each of said pair of spaced support members, said hook adapted for hooking onto said handle assembly.

8. The stroller accessory of claim 1, further comprising:

a securing means being adapted for securing said platform member to said cross member of said stroller.

9. The stroller accessory of claim 8, wherein said securing means comprises:

a fastener being adapted for insertion through said platform member and into said cross member.

10. The stroller accessory of claim 8, wherein said securing means comprises:

a pair of securing straps, each of said pair of securing straps having a first end joined to said second plate of said lip portion of said platform member and having a second end securable to said platform portion proximate said rearward edge thereof.

11. The stroller accessory of claim 10, further comprising:

a releasable fastening means for releasably fastening said second end of said securing strap.

12. The stroller accessory of claim 11, wherein said releasable fastening means comprises a hook and loop fastener.

* * * * *